United States Patent [19]
Phillips

[11] 3,910,129
[45] Oct. 7, 1975

[54] VARIABLE DIAMETER SPLIT-FLANGE PULLEY

[75] Inventor: Ronald L. Phillips, Orchard Lake, Mich.

[73] Assignee: General Motors Corporation, Detroit, Mich.

[22] Filed: Dec. 7, 1973

[21] Appl. No.: 422,698

[52] U.S. Cl. ............... 74/230.17 B; 74/230.17 R; 74/230.17 C
[51] Int. Cl. .......................................... F16h 55/52
[58] Field of Search ............ 74/230.17 A, 230.17 B, 74/230.17 C, 230.17 R, 230.17 E, 230.17 M; 403/359, 349, 259, 261; 151/38

[56] References Cited
UNITED STATES PATENTS

| | | | |
|---|---|---|---|
| 1,822,935 | 9/1931 | Reeves | 74/230.17 B |
| 2,605,121 | 7/1952 | Ensinger | 403/259 |
| 3,069,919 | 12/1962 | Schultz, Jr. | 74/230.14 X |
| 3,352,344 | 11/1967 | Lanius, Jr. | 151/38 X |
| 3,640,148 | 2/1972 | Fischbach | 403/359 X |
| 3,786,688 | 1/1974 | Svenson | 74/230.17 A |

FOREIGN PATENTS OR APPLICATIONS

| | | | |
|---|---|---|---|
| 536,704 | 5/1941 | United Kingdom | 74/230.14 |
| 2,049,071 | 4/1971 | Germany | 74/230.17 B |

Primary Examiner—Samuel Scott
Assistant Examiner—P. S. Lall
Attorney, Agent, or Firm—Charles R. Engle

[57] ABSTRACT

An adjustable pulley having a variable effective diameter including split flanges, one being fixed to a shaft and the other reciprocable slidable relative to the fixed flange. The fixed flange has a hub supporting a Belleville spring engaging a hub of the reciprocable flange continuously biasing it toward a belt received between the flanges.

4 Claims, 3 Drawing Figures

U.S. Patent    Oct. 7, 1975    3,910,129
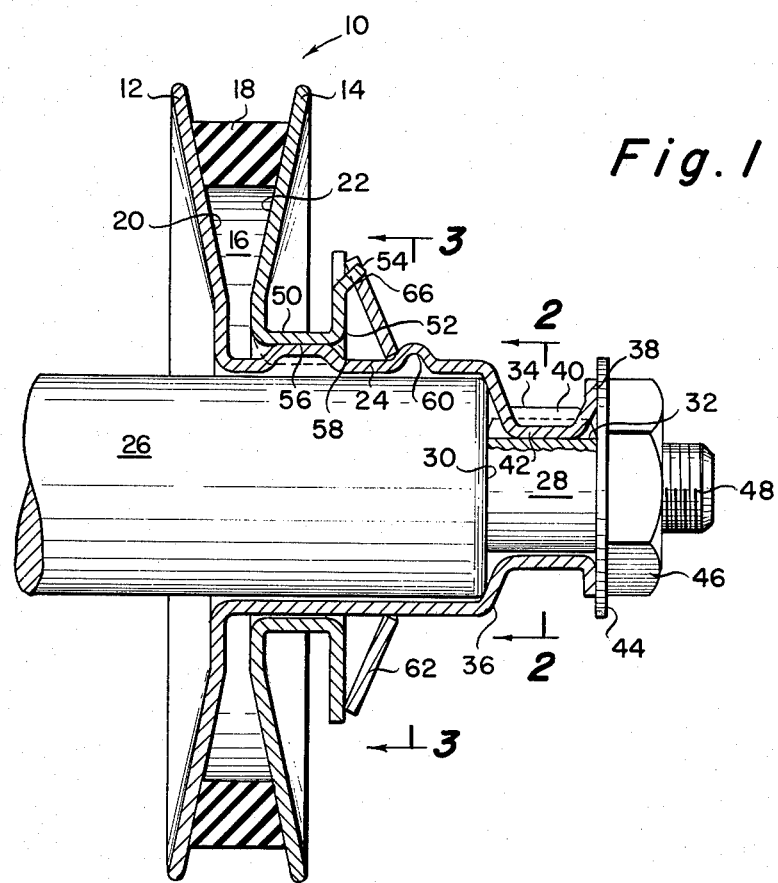
Fig. 1
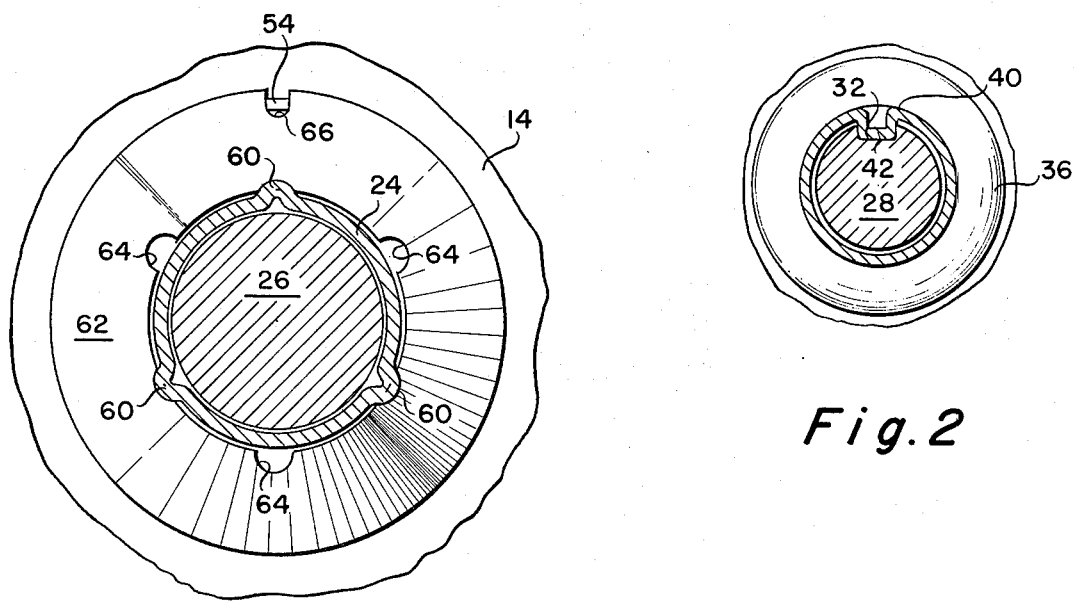
Fig. 3
Fig. 2

VARIABLE DIAMETER SPLIT-FLANGE PULLEY

The present invention relates to a split adjustable pulley of the type incorporating a fixed flange and a reciprocable flange mounted on a shaft for movement relative to the fixed flange. More specifically, the present invention relates to a split pulley wherein a reciprocable flange is continuously biased toward a fixed pulley flange by a Belleville spring secured to both flanges so as to retain the pulley assembled in addition to automatically adjusting for slack.

Split pulley structures, presently known in the art, include a considerable number of separate components and usually require use of final assembly forming operations to lock the components assembled. Further, these known structures also require separate components to provide the necessary driving connections between the pulley flanges and an associated shaft.

These disadvantages are overcome by the structure of the present invention in that the pulley flanges are composed of stamped sheet metal and each includes an integral axially extending hub. The fixed pulley flange and hub includes two splined portions, on engaging with a spline groove in a supporting shaft drivingly connecting the fixed flange and hub to the shaft while the other splined portion engages a mating portion on the reciprocable flange hub drivingly connecting the pulley flanges. The fixed hub is deformed including three equiangularly circumferentially spaced projecting spring seats engaging aligned notches in the inner circumferential surface of a Belleville spring permitting assembly of the spring onto the fixed hub as the spring seats slip through the notches in the spring as it is moved axially over the hub into its assembled position. After the Belleville spring is axially positioned upon the fixed hub and rotated moving the notches out of alignment with the spring seats, it is then depressed so that a tang struck out from a radial flange of the reciprocable hub engages a notch in the outer periphery of the Belleville spring and upon release the spring force frictionally locks the spring in assembled relationship. The slight amount of spring force applied against the struck out tang of the radially extending reciprocable hub flange retains the pulley completely assembled such that the reciprocable hub can move axially relative to the fixed hub by virtue of the axially extending mating splined portions providing the aforementioned driving connection therebetween.

In mechanical installations utilizing endless belts to transmit power from one source to another it is common practice to include an idler pulley having an adjustable pivot point so as to remove any excess slack that may develop in the belt. The slack can result from manufacturing tolerances in the actual fabricating of the belt or it can result from elongation occurring after a period of use. The adjustable pulley structure of the present invention accommodates these variances in belt length by virtue of its being capable of providing a varying effective diameter. Should the belt elongate after a period of use or if the belt initially is on the longer side of the manufacturing tolerance allowance, the pulley flanges are forced closer together by the spring to position the belt at a greater effective diameter and thereby accommodate for the increased length in the belt. Obviously, this structure eliminates the necessity of providing a fixed idler pulley which must necessarily be loosened and forced against the belt to remove excessive slack and then be tightened in a new adjusted position.

Accordingly, a prime object of the present invention is the provision of an economical, reliable and simply constructed adjustable pulley assembly.

Another object of the present invention is the provision of fixed and reciprocable pulley flanges having secured hubs coaxially disposed upon a shaft, the reciprocable flange being biased by a Belleville spring toward the fixed flange forming a belt groove therebetween, the spring being mounted on the fixed hub and secured to the reciprocable hub retaining the pulley assembled.

A further object of the present invention is the provision of stamped sheet metal fixed and reciprocable pulley flanges having integral hubs coaxially disposed upon a shaft, the fixed hub being drivingly connected to the shaft through a spline connection, the reciprocable hub being drivingly connected to the fixed hub through a spline connection permitting relative axial movement therebetween, the fixed flange having three equally circumferentially spaced spring mounting projections, a Belleville spring having three equally circumferentially spaced notches in its inner circumferential periphery receiving the projections and being rotated relative to the fixed flange when the spring is mounted upon the fixed hub, and the reciprocable hub having a struck-out tang engaging a notch in the outer spring periphery retaining the adjustable pulley assembled.

The novel features which I believe to be characteristic of my invention are set forth with particularity in the appended claims. My invention itself, however, both as to its organization and method of operation, may be best understood by reference to the following description taken in conjunction with the accompanying drawings in which:

FIG. 1 is a longitudinal cross-sectional view of a pulley constructed in accordance with my invention.

FIG. 2 is a cross-sectional view taken on line 2—2 of FIG. 1 showing the driving connection between the fixed pulley hub and its supporting shaft.

FIG. 3 is a partial cross-sectional view taken on line 3—3 of FIG. 1.

Referring now to FIG. 1, the adjustable pulley assembly 10 of my invention includes split or separate fixed and reciprocable pulley flanges 12 and 14, respectively, cooperating to form a recess 16 receiving an endless belt 18. In a preferred form, the flanges 12 and 14 include tapered surfaces 20 and 22 so as to accommodate an endless belt in the form of a V-belt.

The fixed pulley flange 12 is preferably of stamped sheet metal construction including an integral hub 24 coaxially positioned upon a shaft 26. The shaft 26 has an end portion 28 of reduced diameter which is adjacent a radially extending shaft face 30. A machined spline groove 32 is provided on the exterior surface of shaft portion 28. The fixed hub 24 is deformed in the form of an annular groove 34 defined by side flange portions 36 and 38 and a bottom section 40. The bottom section 40 is deformed in the form of an internal male spline 42 for engagement with the spline groove 32. When the U-shaped annular groove 34 formed in the fixed hub 24 is positioned adjacent the shaft diametrically reduced portion 28, the side flange 36 is disposed adjacent the radially extending face 30 of the shaft. The side flange 38 engages a washer 44 secured by a nut 46 upon threaded portion 48 of shaft 26 and in this manner the fixed hub 24 is secured to the shaft 26 for driving engagement therewith.

As is best illustrated in FIG. 2, the bottom portion 40 of the U-shaped groove 34 in fixed hub 24 includes the internal spline 42 for mating engagement with spline groove 32 in the shaft portion 28. Of course, it is obvious that the fixed hub 24 can be drivingly connected to the shaft 26 by any conventional means. However, it is significant that the present invention includes the deformation of the fixed hub 24 in the form of the annular U-shaped groove 34 such that washer 44 is tightened into frictional engagement with side flange 38 retaining the fixed hub in place. The tightening of the nut 46 against washer 44 forces the hub 24 axially on shaft 26 until a tight frictional engagement is provided between side flange 36 and radial surface 30 as well as the aforementioned engagement of side flange 38 with washer 44.

With reference again to FIG. 1, the reciprocable flange 14 includes an integral hub 50 which terminates in a radially outwardly extending flange 52 having a struck-out locking tang 54 therein. The fixed hub 24 also includes an externally splined surface 56 which is axially aligned with an internal splined surface 58 on the reciprocable hub 50. The engagement of the exterior spline 56 with the interior spline 58 between the fixed hub 24 and the reciprocable hub 50 permits axial movement of the reciprocable flange 14 relative to fixed pulley flange 12.

The fixed hub 24 also includes three equally circumferentially spaced projections 60 forming spring seats, one of which is shown in FIG. 1. A Belleville spring 62, best illustrated in FIG. 3, includes three equally circumferentially spaced notches 64 spaced to receive the projections 60 on the fixed hub 24 when the spring 62 is positioned upon the hub as illustrated in FIG. 1. The circumferentially spaced notches 64 permit axial movement of the spring 62 upon the fixed hub 24 until it is moved inwardly of the projection 60 whereupon it can be rotated to place the notches 64 out of alignment with projections 60. In this position the inner periphery of the spring 62 engages the projections or spring seats 60 and is rigidly supported upon the fixed hub 24. The rotation of the Belleville spring 62 to this position also aligns a notch 66 in its outer periphery with the struck-out tang 54 on the radially extending flange 52 of reciprocable hub 50. The Belleville spring 62 is depressed a slight amount permitting engagement of the tang 54 within the notch 66 and upon release the tang 54 positively retains the split pulley assembled. The inherent spring characteristics of spring 62 continuously urges the reciprocable pulley flange 14 toward the fixed pulley flange 12 thereby applying a frictional force against the endless V-belt 18 received in the pulley recess 16.

In operation, the force of the spring 62 continuously applies a frictional force against the belt 18 maintaining it in engagement with the respective flange tapered surfaces 20 and 22. The radial position of the belt 18 within the recess 16 is adjusted automatically by the reciprocable flange 14 under the bias of the spring 62. This adjustment feature has particular value in that it provides for the accommodation of endless belts varying in length. The length variations can result from manufacturing tolerances or they can result from elongation occurring during extended use of the belt. Regardless of the cause of the variance in length, any slack occurring in the endless belt is removed by the reciprocable flange 14 being urged by the force of spring 62 to position the belt at a greater effective diameter thereby removing the previously existing slack. Obviously, this structure economically and simply provides for the accommodation of a range of lengths in endless belts. With a pulley assembly constructed in accordance with my invention, it is not necessary to employ adjustable idler pulleys to eliminate undesirable slack.

A further significant feature of my invention resides in the fact that the stamped sheet metal construction of my adjustable pulley provides a fixed pulley flange having an integral hub employing integral means for both drivingly connecting the reciprocable hub thereto and for drivingly connecting the fixed pulley flange to a supporting shaft. The fixed pulley flange also includes the aforementioned projections for positively supporting the Belleville spring. The provision of these features in a single stamped component eliminates several components usually required to provide these features.

While I have shown and described a particular embodiment of my invention it will, of course, be understood that various modifications and alternative constructions thereof may be made without departing from the true spirit and scope of my invention and that I intend by the appended claims to cover all such modifications and alternative constructions as fall within the true spirit and scope of my invention.

I claim:

1. An adjustable pulley having a variable effective diameter drivingly engaging a V-belt at the effective diameter comprising in combination; a shaft, a fixed pulley flange and integral hub positioned upon and secured to said shaft for rotation therewith, a reciprocable pulley flange and integral hub coaxially positioned upon said fixed pulley flange hub for axial reciprocable movement relative to said fixed hub, said fixed and reciprocable hubs both having aligned portions drivingly connecting said fixed and reciprocable pulley flanges, a Belleville spring, means on said fixed hub supporting the internal circumferential surface of said spring, and means on said reciprocable hub engaging a portion of the outer circumferential surface of said spring retaining said spring in engagement with said fixed hub supporting means whereby said adjustable pulley is secured in assembled relationship, said spring continuously biasing said reciprocable pulley flange relative to said fixed pulley flange into engagement with said V-belt.

2. An adjustable pulley having a variable effective diameter drivingly engaging a V-belt at the effective diameter comprising in combination; a shaft, a fixed pulley flange and integral hub coaxially positioned upon said shaft, said shaft and said fixed hub both having aligned splined portions drivingly connecting said fixed hub to said shaft for rotation therewith, a reciprocable pulley flange and integral hub coaxially positioned upon said fixed hub for axial reciprocal movement relative to said fixed pulley flange and hub, said fixed and reciprocable hubs both having aligned splined portions drivingly connecting said fixed and reciprocable flanges for rotation in unison, a Belleville spring, said spring having a plurality of equiangularly spaced assembly notches in the inner circumferential surface of said spring, a plurality of projections formed equiangularly around said fixed hub in a predetermined location in alignment with the notches in said spring, said spring being mounted upon said fixed hub and said notches engaging said projections when assembled and said spring being rotated moving said notches out of alignment with said notches maintaining the spring in a fixed position relative to said fixed hub, a radially extending flange on said reciprocable hub, and means on said radially extending flange fixedly engaging a portion of the outer circumferential surface of said spring locking said spring in place whereby said spring continuously biases said reciprocable flange toward said fixed flange into engagement with the V-belt, said means fixedly engaging the outer circumferential surface of said spring also being effective to retain the adjustable pulley in assembled relationship.

3. An adjustable pulley of stamped sheet metal construction having a variable effective diameter drivingly engaging a V-belt at the effective diameter comprising in combination; a shaft, a fixed pulley flange and integral hub of stamped sheet metal construction positioned upon said shaft, a splined portion on said shaft, a splined portion on said fixed hub in mating engagement with said shaft spline providing a driving connection therebetween, a reciprocable pulley flange and integral hub of stamped sheet metal construction coaxially positioned upon said fixed hub for axial reciprocable movement relative to said fixed hub, said fixed and reciprocable hubs each having a splined portion in mating engagement drivingly connecting said fixed and reciprocable flanges, a Belleville spring, said stamped sheet metal fixed hub having three equiangularly spaced projections extending radially outwardly therefrom, said spring having three equiangularly spaced notches in the internal circumferential surface of said spring, said spring being coaxially positioned upon said fixed hub with said notches receiving the three equiangularly spaced projections on said fixed hub permitting assembly of said spring thereon, a radially extending flange on said stamped sheet metal reciprocable hub, a locking tang struck from the outer periphery of said radially extending flange, and said Belleville spring containing a locking notch receiving said tang when said spring is rotated moving said notches out of alignment with said projections thereby locking said Belleville spring in place and retaining said adjustable pulley in assembled relationship while said Belleville spring is effective to continuously urge said reciprocable flange into engagement with said V-belt.

4. An adjustable pulley of stamped sheet metal construction having a variable effective diameter drivingly engaging a V-belt at the effective diameter comprising in combination; a shaft, a fixed pulley flange and integral hub of stamped sheet metal construction positioned upon and secured to said shaft for rotation therewith, said shaft containing a spline groove, said integral hub including a depressed internally extending male spline mating with said shaft groove providing the driving connection therebetween, a reciprocable pulley flange and integral hub of stamped sheet metal construction coaxially positioned upon said fixed hub for axial reciprocable movement relative to said fixed hub, said fixed and reciprocable hubs each having a splined portion in mating engagement drivingly connecting said fixed and reciprocable flanges, said stamped sheet metal fixed hub having three equiangularly spaced projections extending radially outwardly therefrom, a Belleville spring, said spring having three equiangularly spaced notches in an internal circumferential surface of said spring, said spring being coaxially positioned upon said fixed hub with said notches receiving the three equiangularly spaced projections on said fixed hub permitting axial movement of said spring past said projections relative to said fixed hub, a radially extending flange on said reciprocable hub, and a locking tang struck from the outer periphery of said radially extending flange, said Belleville spring containing a locking notch whereby rotation of said spring aligning said tang with said notch positions said spring notches out of alignment with said hub projections and said spring being seated against said projections, said tang engaging said spring notch when said spring is slightly depressed and the subsequent release thereof applying a spring force against said hub projections and said tang positively retaining the pulley assembled.

* * * * *